United States Patent [19]

Hampton

[11] 4,042,129
[45] Aug. 16, 1977

[54] REFUSE RECLAIMING APPARATUS

[76] Inventor: Robert K. Hampton, 119 Somerset Ave., Garden City, N.Y. 11530

[21] Appl. No.: 687,020

[22] Filed: May 17, 1976

[51] Int. Cl.² .......................................... B65G 65/42
[52] U.S. Cl. .............................. 214/17 DB; 198/519; 198/616; 105/144
[58] Field of Search ............... 214/10, 15 E, 16 R, 214/17 D, 17 DA, 17 DB; 198/519, 616; 105/144, 146

[56] References Cited

U.S. PATENT DOCUMENTS

| | | | |
|---|---|---|---|
| 2,579,153 | 12/1951 | Meissner | 214/10 X |
| 3,618,744 | 11/1971 | Hulette | 198/519 X |
| 3,908,837 | 9/1975 | Strocker | 214/10 |

Primary Examiner—Robert G. Sheridan
Attorney, Agent, or Firm—Edelson and Udell

[57] ABSTRACT

An apparatus for and method of reclaiming refuse from a stored pile thereof which basically includes a vertically swingable drag type conveyor mechanism mounted upon a traveling support which is movable lengthwise along one side of the refuse pile, the conveyor being swingable into work-engaging contact with the surface of the pile to drag refuse therefrom. The conveyor when swung into such contact with the pile surface is shiftable by means of its support lengthwise of the pile so as to enable it to scan the pile surface from end to end thereof and so remove from the pile incremental strata of the refuse to be reclaimed. The swingable conveyor, operating in the manner of a boom, transfers the refuse reclaimed from the storage pile to a second conveyor disposed in a trench extending parallel to the direction of movement of the traveling support for the boom conveyor, from which trench the reclaimed refuse by means of said second conveyor is discharged for transport to a point removed from the storage pile.

7 Claims, 4 Drawing Figures

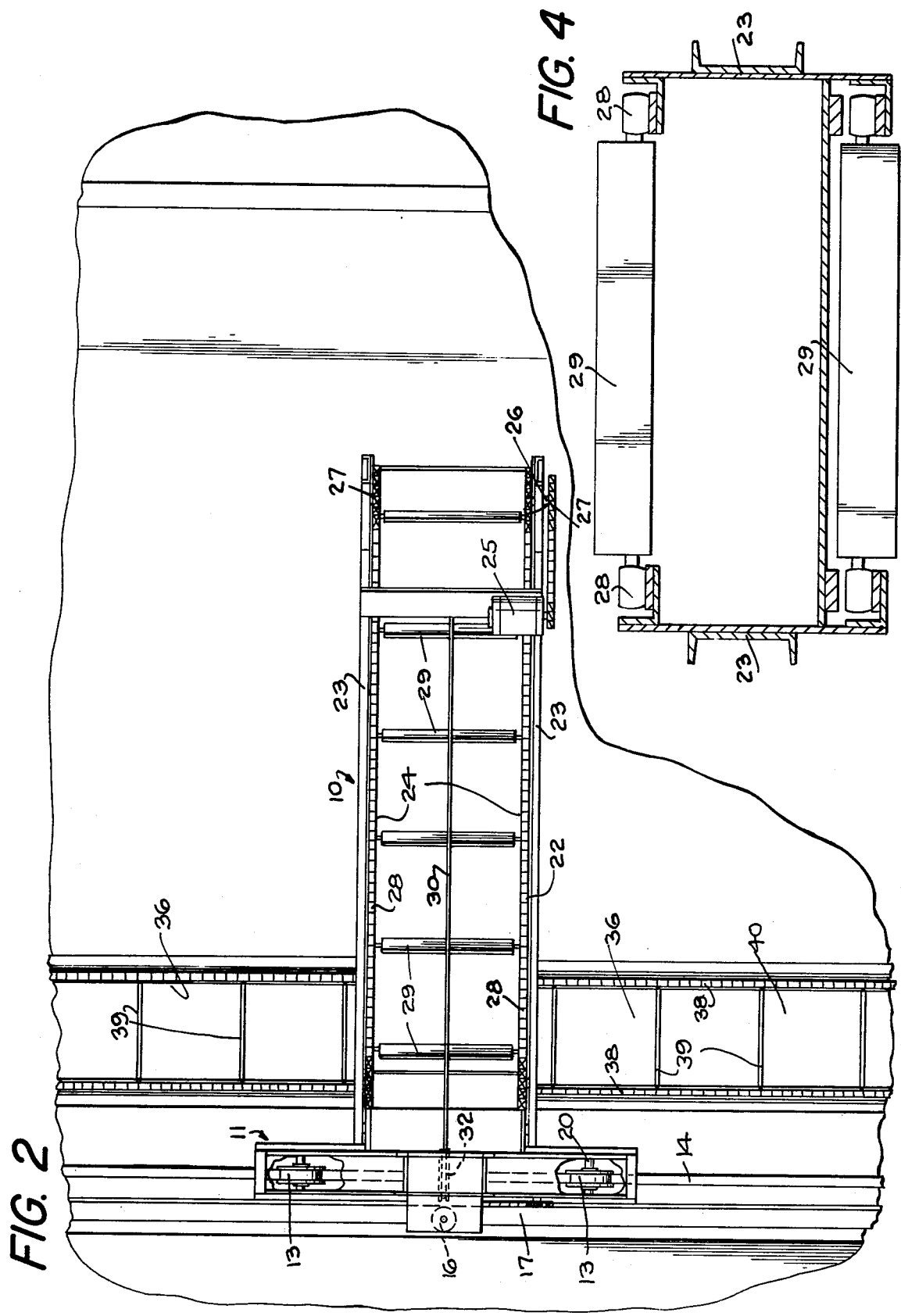

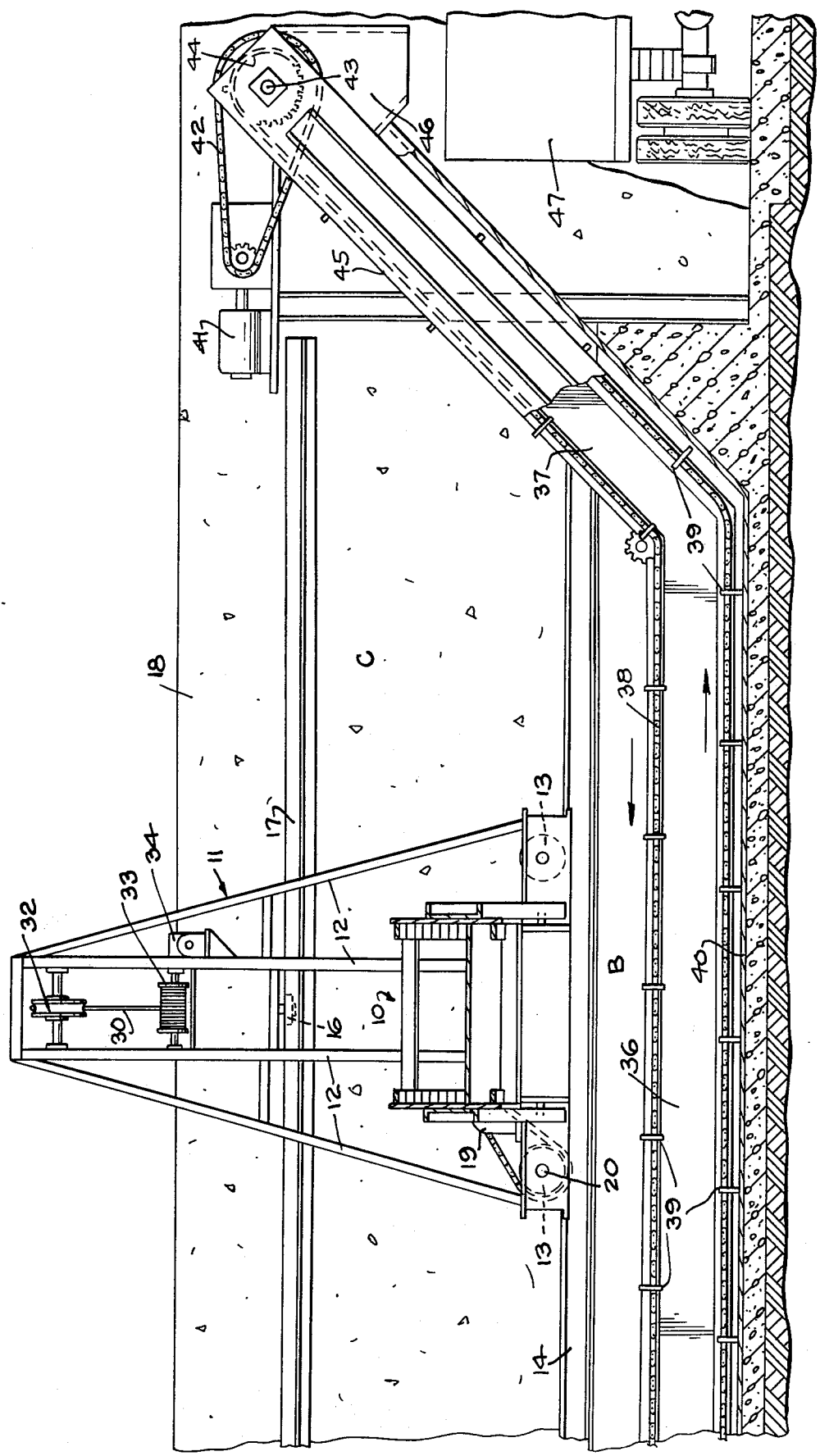

REFUSE RECLAIMING APPARATUS

This invention relates generally to the handling of refuse material and more particularly to improvements in apparatus for and method of reclaiming refuse from a storaged pile thereof.

Heretofore and prior to the present invention, where refuse has been stored for subsequent disposition in an open pile or in a storage silo or bin, it has been the general practice to reclaim the refuse from the open pile thereof either manually or by the use of buckets operating from an overhead bridge crane movable over the top of the pile or from the storage bin or hopper by means of conveyors buried in the bottom of such storage silo or hopper. All of these prior methods required the use of costly material-moving equipment and time-consuming labor and presented problems insofar as they failed to prevent undesired and uncontrolled dispersion of the refuse as it was being removed from the storage pile, thereby often requiring costly laborious and time-consuming clean-up of the areas into which the refuse was undesirably spread. Also, the inaccessibility of the conveyors when buried beneath the piled up refuse presented maintenance and operating problems which were difficult and costly to remedy.

The present invention has as its principal object the provision of an improved apparatus which cleanly and expeditiously removes any desired amount of the refuse from the surface of the stored pile thereof and transfers it to a conveyor running along one side of the pile for eventual discharge into a loading truck for transport of the reclaimed refuse to its final destination. By use of such improved apparatus the refuse may be stored in a pile having an angle of repose of a high degree (up to about 50°) and of any desired length, which pile may be replenished from time to time to supplement and maintain it to its original volume.

A further object of the invention is to provide a combination of two endless conveyors, the first of which is mounted upon a traveling support shiftable along the longitudinally extending base of the refuse pile and swingable into such position relatively to the lengthwise extending surface of the pile as to enable it to scan said surface and drag therefrom refuse for deposit onto a second endless conveyor operating in a trench or pit from whence the refuse is delivered to a truck or other means for transport of the refuse away from the pile from which it was reclaimed.

Still another object of the present invention is to provide a boom type endless conveyor which is operative to move intermittently or continuously across the full length of the refuse pile in one direction or the other to remove the refuse from any desired area or areas of the surface of the pile, this conveyor being so swingably mounted and adjustable in position relatively to the pile surface as to enable it to be maintained in refuse-dragging contact with the surface of the pile as the angle of repose thereof recedes toward the horizontal base of the pile.

Other objects and advantages of the present invention will be apparent more fully hereinafter, it being understood that the invention consists in the combination, construction, location and relative arrangement of parts, as well as in the method of operation, all as described in detail in the following specification, as shown in the drawings and as finally pointed out in the appended claims:

In the drawings:

FIG. 2 is a horizontal plan view of the apparatus;

FIG. 3 is an elevational view as taken along the line 3—3 of FIG. 1; and

FIG. 4 is a transverse sectional view as taken along the line 4—4 of FIG. 1.

Figure 1:
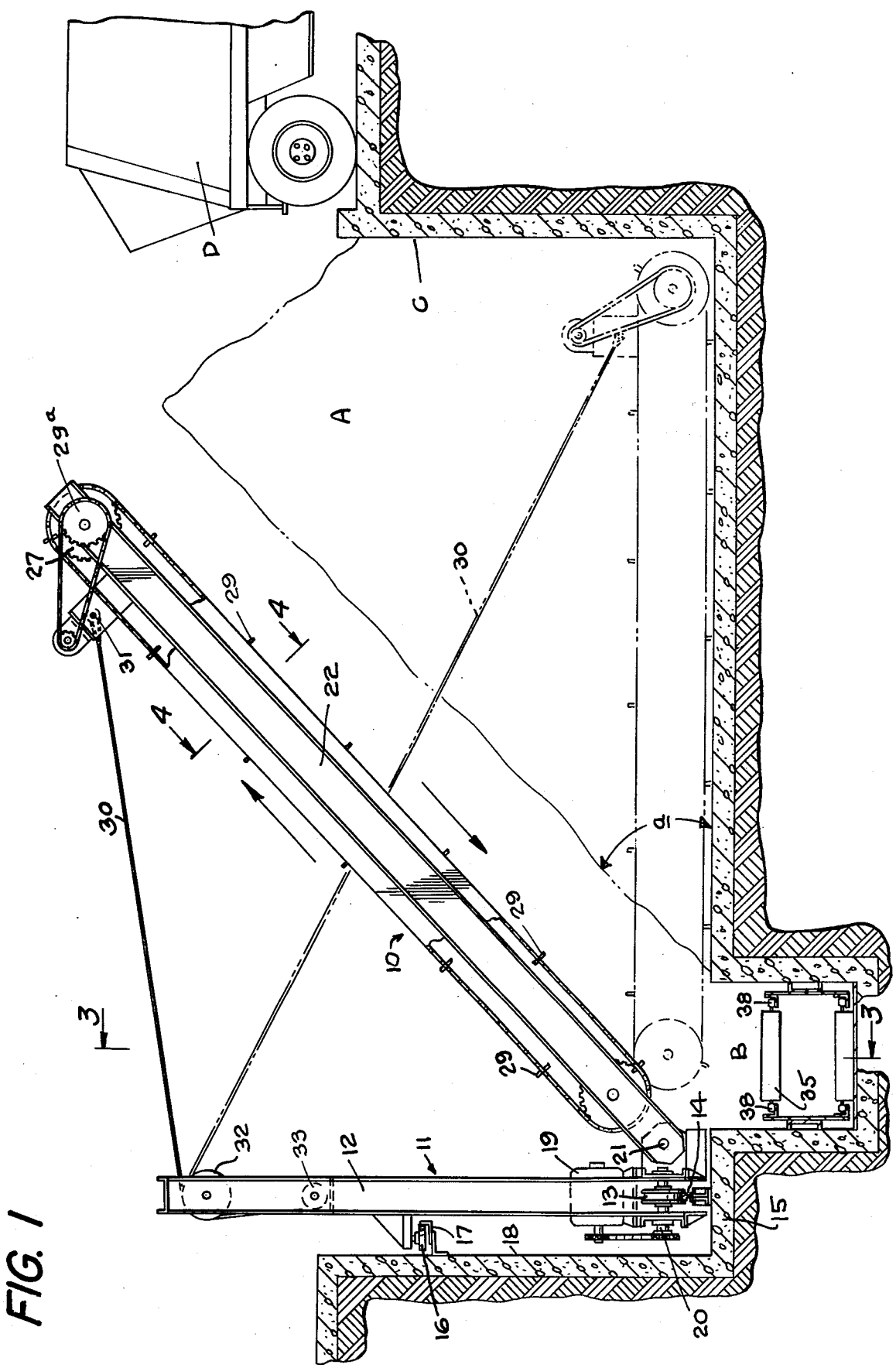
FIG. 1 is a side elevational view of the refuse reclaiming apparatus constructed in accordance with and embodying the principles of the present invention, certain portions of the surrounding structure being shown in section.

Referring now to the drawings and more particularly to FIG. 1, it will be observed that the apparatus of the present invention basically consists of a drag type conveyor, designated generally by the numeral 10, which is pivotally mounted in the manner of a boom on a traveling support 11 shiftable horizontally along one side of a pile A of refuse to progressively shift the boom conveyor along said side of the pile for scraping the refuse from the surface of the pile into a reclaiming pit B. The pile A of refuse, as shown in FIG. 1, is preferably stored in a bin C into which it is dumped by means of a truck D or any other suitable device employed for transporting the refuse from its source to the storage pile. The bin C which may be of any desired length and of a width capable of storing therein a refuse pile having a steep angle of repose a, e.g., up to 50° or more, is channeled along one side thereof to provide the longitudinally extending reclaiming pit B which is of a depth extending below the floor level of the bin C sufficient to receive therein a suitable conveyor, preferably a drag type conveyor, for dragging the refuse which was transferred from the stored pile A thereof into the pit B to a point where it may be loaded for removal to its final destination.

It will be understood that the channeled pit B is of a length coextensive with the length of the pile A of refuse deposited in the bin C and that the horizontal travel of the boom conveyor 10 is such that it may scan the full length of the refuse pile A along the side thereof which faces the pit B.

The traveling support 11 for the pivoted conveyor 10 consists of a vertically extending rigid frame 12 which is provided at its bottom end with a pair of suitably flanged roller wheels 13—13 arranged in tandem relation for travel along a horizontally extending track 14 securely mounted upon the longitudinally extending outside ledge 15 of the pit B. The track 14 extends along substantially the full length of the conveyor pit B in parallel relation thereto and thus provides for travel of the support frame of the pivoted boom conveyor lengthwise along substantially the full length the outer side of the pit B (and of the pile A of the refuse stored in the bin B).

The traveling frame 11 is sustained in its vertically extending position by a horizontally disposed roller wheel 16 suitably mounted upon the frame for engagement with a horizontally extending retaining rail 17 rigidly secured in turn to the inner surface 18 of the outer wall of the storage bin C at a suitably elevated point thereon. A reversible drive electric motor 19, carried by the traveling support 11 at the bottom end thereof, is connected by a chain or other suitable drive to the shaft 20 of one of the roller wheels 13—13 for shifting the support back and forth as desired along its guide track 14. Preferably, the motor 19 is of the type which includes clutch and brake means for stopping the motor to hold the support stationary at any point along the length of its permissible travel in one direction or the other and then re-starting it for continued travel in either direction as desired.

The motor 19 may be any conventional reversible type having coupled thereto an electrically energizable magnetic brake and its operation may be controlled by suitable limit switches (not shown) connected in circuit with the motor for interrupting the current supply to the motor when the traveling support reaches the end of its movement in either direction and reactivating the motor for reverse movement thereof. Of course, any suitable electrical circuitry may be employed for control of the motor 19 for effectively scanning that side of the refuse pile A from which the refuse is dragged by the boom conveyor for transfer into the reclaiming pit B.

Pivotally secured as at 21 to the base of the traveling support 11 for swinging movement toward and away from the support (and toward and away from the refuse pile A) is a boom-type conveyor assembly 22 consisting of a pair of rigid frame members 23—23 between which is supported an endless belt or chain drag type conveyor mechanism 24, which mechanism is operated by means of an electric motor 25 suitably mounted upon its supporting frame 23—23 at the outboard end thereof and operatively connected to the shaft 26 of a pair of head sprockets 27—27 about which are entrained the opposite side chains 28—28 of the conveyor by a chain and sprocket drive 29a or the like.

This drag conveyor mechanism includes a plurality of transversely extending flights 29 which are suitably spaced along the endless length of the conveyor chains 28—28 and act upon operation of the conveyor in the direction indicated by the arrows in FIG. 1 to scrape refuse from the pile A thereof outwardly across the top surface of the pile toward and into the pit B extending lengthwise along the base of the pile. The refuse pile A is initially formed by dumping the refuse directly into the storage bin C through the use of dump trucks D as shown, or by other means, such as overhead conveyors mounted adjacent the bin.

The outboard end of the motor-driven conveyor assembly 22 is connected to its vertically extending traveling support 11 by a cable 30 which extends from its point of securement to the swingable conveying mechanism, as at 31, to and about a guide pulley 32 carried at the top end of the traveling support 11 and then to a cable winding drum or winch 33, also carried by the traveling support in vertically spaced relation to the guide pulley 32. This winch drum 33 is individually motor-driven by an electrically operated hoisting motor 34 of any conventional reversible type having coupled thereto an electrically energizable magnet brake or the like for controlling and holding the boom conveyor mechanism 24 at any desired angle for such penetrating contact with the existing reposed surface of the refuse pile A as to enable it to drag surface increments of the refuse from the pile downwardly into the conveyor pit B simultaneously as the drag conveyor 24 scans the penetrated surface of the pile from end to end thereof or any intermediate region of said surface.

Occupying the reclaiming pit or trench B and emerging therefrom at the discharge end thereof is a conveyor mechanism 35 having a horizontally extending main section 36 fitted within the horizontal length of the trench and an inclined discharge section 37 extending outwardly and upwardly from an end of the trench B to a point well above ground level. This conveyor 35 is preferably of the endless chain type having a pair of laterally spaced sprocket chains 38—38 which carry therebetween a plurality of transversely extending flights or scrapers 39 spaced uniformly along the lengths of the chains.

The flights 39 of the lower run of the pit conveyor 35 drag along the surface of a wear plate 40 which extends along the full length of the trench or pit B as a bottom liner therefor and thence upwardly as a bottom liner for the inclined discharge section of the conveyor. The latter is driven by a motor 41 through a chain and sprocket drive 42 operatively connected to the shaft 43 of a pair of head sprockets 44 about which are entrained the opposite side chains of the conveyor.

The inclined discharge section of the pit conveyor 35 is preferably suitably enclosed within a housing 45 having a discharge chute 46 at its outer end. The refuse dragged out of the reclaiming pit or trench B by the conveyor flights 39 of the lower run of the conveyor moving along the bottom of the pit in the direction indicated by the arrow in FIG. 3 is discharged through the discharge chute 46 into a loading truck 47 or other device for moving the refuse to its desired point of final disposal.

In operation of the apparatus of the present invention, when it is desired to remove the refuse from the pile A thereof accumulated in the storage bin C, the boom conveyor 10 is lowered about its pivot under control of the hoisting motor 34 operating upon the winch 33 into a position wherein the flights 29 of the bottom run of the conveyor dig into the surface of the stored refuse pile to an extent sufficient to enable the conveyor, when operated, to drag the refuse from the pile for deposit into the trench or pit B from which it is removed by the pit conveyor 35. Having lowered the boom conveyor 10 into its aforesaid refuse-engaging position, it may then be shifted laterally to scan the surface of the refuse pile from end to end thereof, which scanning movement of the boom conveyor 10 is effected under control of the boom-shifting motor 19 mounted on the traveling support 11. This scanning operation back and forth along the surface of the refuse pile A is continued so long as the boom conveyor 10 is in a position effective to scrape refuse from the surface of the pile stored in the bin C and it will be apparent that as this scanning operation is carried out the boom conveyor may be progressively lowered to accomodate it to changes in the exposed level and angle of repose of the refuse pile. This operation of dragging the refuse from the pile A thereof for transfer into the reclaiming pit B by the boom conveyor 10 may be continued until there is virtually no refuse remaining upon the floor of the storage bin C, it being noted in this connection that the boom conveyor 22 is swingable from a substantially vertically disposed position closely adjoining the vertical plane of movement of its traveling support 11 into a horizontal position closely adjoining the horizontal floor of the storage bin C.

Simultaneously as the refuse is transferred from the pile A into the reclaiming trench or pit B, the refuse so deposited in the pit is dragged lengthwise thereof by the bottom run of flights of the pit conveyor 35 for discharge therefrom through the elevated chute 46 at the end of the pit into the loading truck 47 or other device for transfer of the reclaimed refuse to the desired point where it is finally disposed of or used.

From the foregoing, it will be apparent that any desired amount of the refuse stored as a pile A in the storage bin C (or even as an unconfined pile on the ground level in closely adjoining relation to a trench or pit such as that designated B extending along substantially the full length of the pile and having a conveyor such as the conveyor mechanism 35 operative therein) may be incrementally removed from the pile as desired for transfer to a remote point or station.

Also, it will be understood that although it is preferred that the boom conveyor and pit conveyor mechanisms be operated simultaneously, they may be individually operated intermittently in any sequence as may be desired. Also, the motor driven hoisting winch 33 may be of the conventional type having ratchet and pawl means (not shown) in lieu of the electrically energizable brake means hereinbefore mentioned to permit descent of the boom conveyor mechanism into its desired lowered position by gravity under the influence of its own weight, in which position it would be held during its dragging operation on the refuse pile.

Various types of conveyor mechanisms may be employed for operation upon the refuse pile and for ultimate discharge of the refuse transferred from the pile into the reclaiming pit. Also, where the pile of refuse is large enough and of substantial length to warrant their use, a plurality of the boom conveyors 22 may be arranged in tandem relation for individual movement along a single track so that each of such conveyors may be operated to scan different regions of the same surface of the pile of refuse. Or, if desired, the pile of refuse may be disposed centrally between a pair of laterally spaced parallel reclaiming pits such as that designated B, one on each side of the pile having operative therein a pit conveyor mechanism such as that designated 35 to which refuse from each side of the pile is fed by a separate boom conveyor mechanism such as that designated 22, which separate conveyors are respectively adapted to be swung into contact with opposite sides of the refuse pile.

Accordingly, it will be understood that the present invention is susceptible to various changes and modifications which may be made from time to time without departing from the principles or real spirit thereof and that it is intended to claim the invention broadly, as well as specifically, as indicated by the appended claims.

What is claimed as new and useful is:

1. Apparatus for reclaiming refuse from a pile thereof confined within a generally rectangular area of substantial length and stored with the top surface thereof fully exposed comprising in combination a below-ground-level elongated storage bin defined along its opposite sides by a pair of vertically extending laterally spaced parallel walls and a bottom floor extending horizontally between said side walls, said bin being provided along one side wall thereof with an adjacent elongated depressed trench which extends substantially the full length of said bin and has an open top disposed substantially flush with the bottom floor of said bin, said trench being spaced inwardly of its adjacent side wall of said bin to provide the latter with a bottom wall portion extending laterally beyond the outer side of said trench, a first endless conveyor mechanism having a running section operative to drag refuse from the top of the stored refuse pile toward one side thereof and into said trench, a traveling support for said conveyor mechanism shiftable lengthwise along said laterally extended bottom wall portion of said bin, means for operatively mounting said conveyor mechanism on said traveling support for vertical movement thereof into a position substantially paralleling the angle of repose of the stored refuse pile for penetrating engagement with the refuse resting on the surface of said pile, means for effecting operation of said conveyor mechanism and shifting movement of its said traveling support whereby to drag refuse from the surface of said pile as said conveyor scans the same, and coacting means interconnecting said traveling support and said one side wall of said bin outboard of said trench to constantly maintain said support in vertical position against the counteracting tilting weight of said conveyor mechanism during the course of travel of the latter along the surface of said refuse pile.

2. Apparatus as defined in claim 1 including motor-driven means for reversibly shifting said traveling support within the limits of its permissible movement along the length of said storage pile.

3. Apparatus as defined in claim 1 wherein means are provided to selectively adjust the tilt of said conveyor mechanism relatively to said stored pile of refuse for operative working engagement of the conveyor with said refuse whereby to effectively drag refuse from said pile thereof as the conveyor mechanism scans the pile surface in one direction or another.

4. Apparatus as defined in claim 1 wherein said conveyor mechanism is an endless drag type conveyor having spaced flights extending transversely across the running length of the conveyor and adapted to penetrate the surface of the refuse pile to an extent sufficient to drag refuse from said pile surface.

5. Apparatus as defined in claim 1 which includes a second conveyor mechanism operatively disposed in said trench for conveying the reclaimed refuse deposited therein to a discharge end thereof, and means for receiving the refuse discharged from the trench for transport to a point of disposal removed from the stored pile of refuse.

6. Apparatus as defined in claim 1 wherein said traveling support for said first conveyor mechanism is pivotally mounted for tiltable swinging movement to and from the exposed surface of the refuse pile about a pivot on said traveling support disposed above said outwardly extending bottom wall portion of said bin and outboard of the outer side of said trench whereby said tiltable conveyor extends freely across the open top of said depressed trench for engagement with the refuse pile.

7. Apparatus as defined in claim 1 wherein said coacting means includes an elongated track extending parallel to the path of travel of said traveling support and mounted upon said one side wall of said pit and roller means carried by said traveling support and engageable with said track at a point substantially elevated above and within the vertically projected area of said outwardly extending bottom wall portion of said bin.

* * * * *